Oct. 1, 1968 N. SZEREMY ET AL 3,404,226
AUTOMATIC CONTRAST AND BRIGHTNESS CONTROL FOR TELEVISION RECEIVER UTILIZING A LIGHT DEPENDENT RESISTOR
Filed March 25, 1965
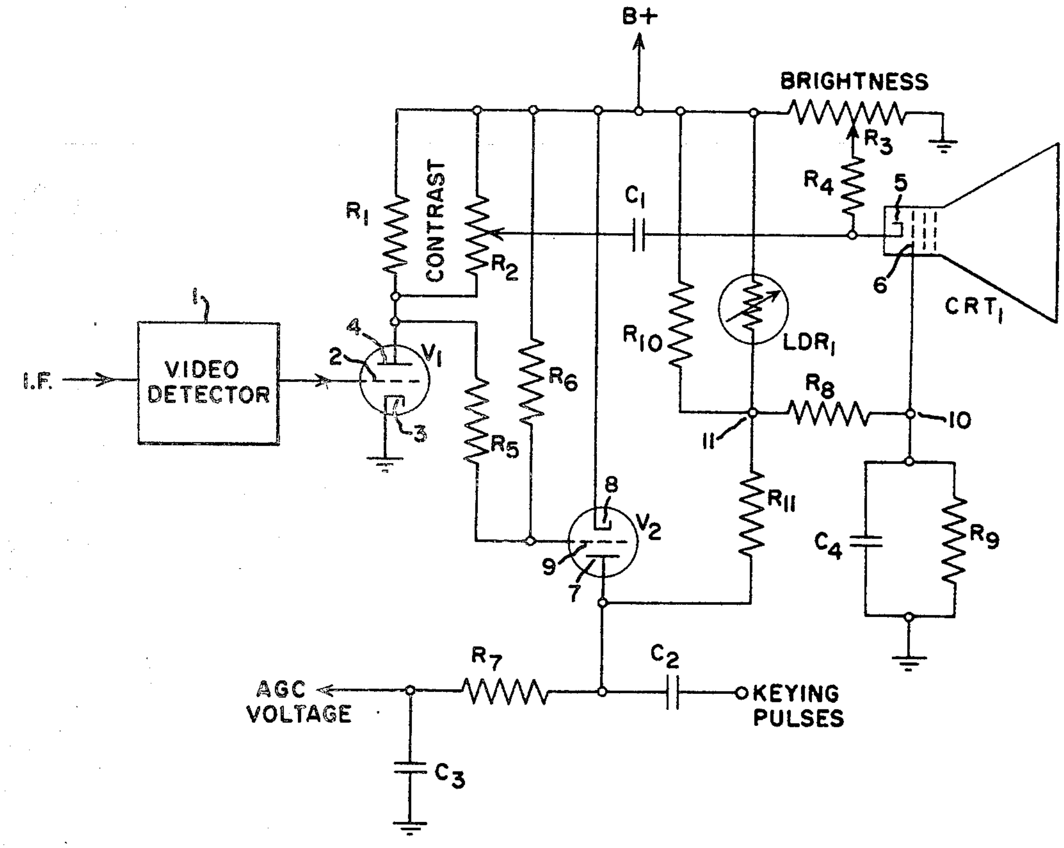
INVENTORS:
NORMAN SZEREMY,
PAUL J. PELCZYNSKI,
BY William S Wolfe
THEIR ATTORNEY.

United States Patent Office 3,404,226
Patented Oct. 1, 1968

3,404,226

AUTOMATIC CONTRAST AND BRIGHTNESS CONTROL FOR TELEVISION RECEIVER UTILIZING A LIGHT DEPENDENT RESISTOR

Norman Szeremy and Paul J. Pelczynski, Syracuse, N.Y., assignors to General Electric Company, a corporation of New York Filed Mar. 25, 1965, Ser. No. 442,625
7 Claims. (Cl. 178—7.5)

ABSTRACT OF THE DISCLOSURE

In a television receiver, a voltage divider is connected between B+ and ground to provide automatic contrast and brightness control in a controlless keyed automatic gain control circuit. The divider includes a light dependent resistance, which is inversely proportional to the ambient light and connected in series with first and second resistances. A first intermediate terminal between the first and second resistances is connected to the grid of the cathode ray tube to provide automatic brightness control. A second intermediate terminal between the light dependent resistance and the first resistance is coupled to the high impedance anode of a keyer tube in the automatic gain control stage to provide automatic contrast control.

The present invention relates to control circuitry for television receivers and more specifically to an automatic contrast and brightness control for such receivers.

It is known to utilize a light dependent resistance (LDR) to achieve automatic contrast and brightness control in a television receiver employing a keyed automatic gain control (AGC) circuit. However, the use of an LDR for this purpose has previously been limited to television receivers employing keyed AGC circuits of the type wherein the cathode of the keyer tube is near ground potential.

In one such prior art circuit the LDR is connected between ground and one end of the brightness potentiometer, the opposite end of the brightness potentiometer being connected to B+. The center tap of the brightness potentiometer is connected to the cathode of the cathode ray tube through a suitable cathode resistor. Accordingly, changes in ambient light level cause corresponding voltage changes across the LDR to thereby control the grid-cathode bias of the tube and thus the brightness of the presentation.

In order to achieve contrast control in such a circuit, the junction between the brightness potentiometer and the LDR is conventionally connected to the grid of the keyer tube through a suitable coupling resistance. In this manner changes in the voltage across the LDR produced by changes in ambient light level are coupled to the grid of the keyer tube to control the conduction of the tube and thus the AGC voltage level. In this manner the AGC voltage level is varied to control contrast in accordance with the ambient light level.

Since in the prior art circuit the keyer grid is near ground potential and the voltage applied to the grid from the junction between the brightness potentiometer and the LDR is similarly near ground potential, a relatively low value coupling resistor can be employed without impairing the operation of the AGC circuit. Thus, relatively large voltage changes are produced at the grid of the keyer tube as the resistance of the LDR varies and a large range of contrast control is achieved.

However, an LDR cannot be utilized in this manner where a keyed AGC of the "controlless" type is employed. In such a controlless keyed AGC the cathode of the keyer tube is conventionally connected directly to B+ potential and the grid of the tube is accordingly operated near B+ potential. The term "controlless" arises from the fact that generally such AGC circuits are not provided with potentiometers for manual adjustment. However, the term "controlless' as utilized throughout this specification refers broadly to a keyed AGC circuit wherein the grid and cathode of the keyed tube are operated near B+ potential and is not concerned with the absence or presence of such potentiometers.

If automatic contrast control were attempted in the above-described manner where a controlless keyed AGC circuit is employed, the junction between the brightness potentiometer and the LDR would have to be connected to the grid of the keyer tube through a very high value coupling resistor since the grid is essentially at B+ potential whereas the junction is near ground potential.

However, a high value coupling resistor cannot be employed in this manner since the grid of the keyer tube represents a relatively low impedance and changes in the voltage across the LDR would appear almost entirely across such a coupling resistor and would have negligible effect on the AGC voltage.

Because of this problem, television receivers employing the controlless keyed AGC are not presently provided with automatic contrast control, automatic brightness control alone being provided in the conventional manner.

Accordingly, it is an object of the present invention to provide an improved automatic contrast and brightness control for a television receiver.

It is a further object of the invention to provide an automatic contrast and brightness control in conjunction with a controlless keyed AGC.

Yet another object is to provide an automatic contrast and brightness control for a television receiver employing a keyed AGC of the type wherein the cathode of the keyer tube is connected directly to B+ potential.

These and other objects are achieved in one embodiment of the invention through the use of a voltage divider connected between B+ and ground. The voltage divider includes serially connected first and second resistors and a light dependent resistance. An intermediate point of the voltage divider is connected to the grid of the cathode ray tube to control grid-cathode bias in accordance with ambient light level to thereby provide automatic brightness control. A second intermediate point of the voltage divider is connected to the plate of the keyer tube in order to vary the AGC voltage at the plate in accordance with ambient light level to thereby provide automatic contrast control.

The novel and distinctive features of the invention are set forth in the appended claims. The invention itself, together with further objects and advantages thereof, may best be understood by reference to the following description and accompanying drawing in which:

The single figure is a schematic diagram of the automatic contrast and brightness control of the invention.

Referring to the figure there is shown an automatic contrast and brightness control in accordance with the invention in conjunction with a keyed AGC circuit of the controlless type.

As depicted, the IF signal is applied to a conventional video detector 1, the composite video signal at the output of the detector being applied to the grid 2 of the video amplifier $V_1$. The cathode 3 of the video amplifier $V_1$ is grounded while the anode 4 is returned to a suitable B+ supply through a load resistance $R_1$.

In conventional fashion, a contrast potentiometer $R_2$ is connected in shunt with the load resistance $R_1$, the center tap of the potentiometer $R_2$ being coupled through coupling capacitor $C_1$ to the cathode 5 of $CRT_1$ to apply the amplified composite video signal thereto. In this manner the range of the video signal applied to the cathode 5 of $CRT_1$ can be controlled by manipulation of the contrast potentiometer $R_2$ to control the contrast of the presentation.

The brightness of $CRT_1$ is manually controlled in conventional fashion through the use of a brightness potentiometer $R_3$ connected between B+ and ground. The center tap of the brightness potentiometer $R_3$ is returned to the cathode 5 of $CRT_1$ through a cathode resistor $R_4$ thereby controlling the bias between the cathode 5 and 6 of $CRT_1$ and thus the brightness of the presentation.

A keyed automatic gain control is provided comprising a keyer tube $V_2$ having anode, cathode and grid electrodes 7, 8 and 9 respectively. The keyed automatic gain control is of the controlless type, the cathode 8 accordingly being connected to the B+ supply and no manual adjustment being provided. Keying pulses from the horizontal deflection system in phase with the synchronizing signal component of the composite video signal are coupled to the anode 7 of keyer tube $V_2$ through a coupling capacitor $C_2$ in conventional fashion. The grid 7 of keyer tube $V_2$ is biased slightly below the B+ voltage at the cathode through the use of a voltage divider comprising resistors $R_5$ and $R_6$. The resistors $R_5$ and $R_6$ are serially connected between the anode 4 of the video amplifier $V_1$ and the B+ supply, the junction between these resistors being connected to grid 9 of keyer tube $V_2$.

The composite video signal at anode 4 is thus coupled to the grid 9 to control conduction of the keyer tube $V_2$ during the application of the keying pulses thereto so as to produce a pulsating DC voltage at the anode 7 of the keyer tube which is representative of the magnitude of the sync pulses and thus of signal strength. The voltage thus developed at the anode 7 is filtered by a filter comprising resistor $R_7$ and capacitor $C_3$ to produce an AGC voltage which is applied to the RF and IF stages of the receiver in conventional fashion to control the gain thereof. For example, conventional circuitry might be employed to delay the application of the AGC voltage to the RF stages if so desired. It will be appreciated that since the AGC voltage controls the gain of the receiver to maintain the level of the video signal at the cathode 5 of $CRT_1$ essentially constant, that the AGC voltage will in effect define the contrast of the presentation and thus can be controlled in such a manner as to provide automatic contrast control.

In accordance with the invention a light dependent resistance $LDR_1$ is employed to provide both automatic contrast and brightness control in conjunction with the controlless keyed automatic gain control. A voltage divider is provided comprising $LDR_1$ serially connected with resistors $R_8$ and $R_9$, the resistance of $LDR_1$ varying inversely with ambient light level.

A resistor $R_{10}$ is placed in shunt with $LDR_1$ in order to limit the range of the voltage appearing across $LDR_1$ and to maintain current flow through $LDR_1$ at a level within the power rating thereof. In some applications the resistor $R_{10}$ might be eliminated. The resistor $R_9$ is bypassed by a capacitor $C_4$ in order to maintain the junction 10 between resistors $R_8$ and $R_9$ at ground potential with respect to the video signal. The junction 10 is connected to the grid 6 of $CRT_1$ to control the grid-cathode bias and thus the brightness of the presentation in accordance with the ambient light level.

The junction 11 between $LDR_1$ and $R_8$ is connected through a coupling resistor $R_{11}$ to the anode 7 of the keyer tube $V_2$ to control the level of the AGC voltage and thus the contrast of the presentation in accordance with ambient light level.

The operation of the automatic brightness control is such that as the ambient light level increases and the resistance of $LDR_1$ accordingly decreases the voltage at junction 10 goes more positive. Thus, the grid 6 of $CRT_1$ becomes more positive with respect to cathode 5 and the brightness of the presentation is increased. Conversely, when the ambient light level decreases and the resistance of $LDR_1$ accordingly increases, the voltage at junction 10 goes more negative. Thus, the voltage at grid 6 goes more negative with respect to the cathode 5 and the brightness of the presentation is decreased.

The resistors $R_8$ and $R_9$ are chosen in conjunction with $LDR_1$ and the shunting resistor $R_{10}$ to provide a desired relationship between brightness and ambient light level.

The operation of the automatic contrast control of the invention can best be understood by assuming the presence of a pulsating D.C. signal having particular average value at the anode 7 of keyer tube $V_2$. The pulsating D.C. signal is filtered to define the AGC voltage level and thus the gain of the receiver. Deviation from the particular average value assumed will accordingly result in changes in the gain of the receiver and thus in the contrast of the presentation.

As the ambient light level increases and the resistance of $LDR_1$ decreases, the junction 11 becomes more positive. A portion of the voltage change at the junction 11 is coupled to the anode 7 of keyer tube $V_2$ via the coupling resistor $R_{11}$ thus causing the averaging value of the signal at anode 7 to go more positive, thereby increasing the gain of the receiver and increasing contrast in the desired fashion. Conversely, when the ambient light level decreases the resistance of $LDR_1$ increases and the voltage at junction 11 similarly decreases. Accordingly, the average value of the signal at anode 7 is caused to go more negative thereby decreasing the gain of the receiver and decreasing contrast of the presentation.

In contrast to the prior art problem discussed above, the coupling resistor $R_{11}$ may have a relatively low value without adversely affecting the operation of the keyer circuit. Since a low value coupling resistor is employed, a relatively large proportion of the voltage change at the junction 11 is coupled to the anode 7 and a wide range of contrast control is achieved. Since the anode 7 of the keyer tube $V_2$ represents a point of relatively high impedance the voltage at junction 11 will not appear entirely across the coupling resistance as is the case where the coupling resistance works into a relatively low impedance.

The ratio of the resistance $R_{11}$ to the impedance between the anode 7 of $V_2$ and ground will determine the range of contrast change. Thus, by proper selection of these values the contrast change can be made to track the brightness change in almost any desired manner.

In one particularly successful embodiment of the depicted invention, the following circuit values and voltages were employed.

Voltages:

| | | |
|---|---|---|
| B+ voltage | volts | 278 |

Tubes:

| | |
|---|---|
| $V_1$ | ½ 6AF11 |
| $V_2$ | ½ 6JN8 |

Resistors:

| | | |
|---|---|---|
| $R_1$ | ohms | 4500 |
| $R_2$ | | 25K |
| $R_3$ | | 200K |
| $R_4$ | | 150K |
| $R_5$ | | 100K |
| $R_6$ | | 10K |
| $R_7$ | | 100K |
| $R_8$ | | 300K |
| $R_9$ | | 27K |
| $R_{10}$ | | 100K |
| $R_{11}$ | | 1,500K |

Capacitors:

| | | |
|---|---|---|
| $C_1$ | mf | 0.1 |
| $C_2$ | pf | 470 |
| $C_3$ | pf | 800 |

Although the invention has been described with respect to certain embodiments, it will be appreciated that modifications and changes may be made by those skilled in the art without departing from the spirit and scope of the invention. Specifically, it will be appreciated that although in the depicted circuit the junction 11 is connected through coupling resistor $R_{11}$ to the anode 7 of the keyer tube $V_2$ other automatic gain control circuits might be employed wherein it would be advantageous to feed a point of relatively high impedance other than the anode of the keyer tube.

What we claim and desire to secure by Letters Patent of the United States is:

1. An automatic contrast and brightness control circuit for a television receiver including a cathode ray tube, said circuit comprising;

(a) a keyed automatic gain control stage including a circuit point in said automatic gain control stage, said circuit point having a relatively high impedance to ground as compared to the overall impedance to ground of said automatic gain control stage, (b) a source of positive voltage, (c) voltage divider means connected across said source of positive voltage, said means including a light dependent resistance, (d) means connecting a first intermediate point of said voltage divider means to the control grid of the cathode ray tube to vary the brightness of the cathode ray tube in direct proportion to variations in the ambient light level, and (e) means connecting a second intermediate point of said voltage divider to said circuit point to vary the gain of the receiver in direct proportion to variations in the ambient light level.

2. The circuit defined in claim 1 wherein;

(a) said voltage divider means comprises the serial combination in the order named of said light dependent resistance, a first resistance and a second resistance, (b) said first intermediate point being the junction between said first and second resistances, (c) said second intermediate point being the junction between said light dependent resistance and said first resistance, and (d) said light dependent resistance being inversely proportional to the ambient light level.

3. The circuit defined in claim 2 wherein said source of positive voltage is the B+ supply of the television receiver, said light dependent resistance being connected to the B+ supply and said second resistance being connected to ground.

4. The circuit defined in claim 2 wherein a third resistance is connected in shunt with said light dependent resistance.

5. The circuit defined in claim 2 wherein the controlless keyed automatic gain control stage includes a keyer tube having an output electrode and said second intermediate point is connected to said output electrode through a coupling resistance.

6. The circuit defined in claim 5 wherein said output electrode is the anode of said keyer tube.

7. An automatic contrast and brightness control circuit for the cathode ray tube of a television receiver including a keyed automatic gain control stage of the type wherein the grid and cathode of the keyer tube are operated near B+ potential, said circuit comprising;

(a) voltage divider means connected across a voltage source, said means comprising the serial combination in the order named of a light dependent resistance, first resistance and second resistance, (b) the resistance of said light dependent resistance being inversely proportional to ambient light level, (c) means connecting the junction between said first and second resistances to the control grid of the cathode ray tube to vary the brightness of the cathode ray tube in direct proportion to variations in said ambient light level, and (d) resistive means connecting the junction between said light dependent resistance and said first resistance to the anode of the keyer tube to vary the gain of the receiver in direct proportion to variations in said ambient light level.

References Cited

UNITED STATES PATENTS

| | | | |
|---|---|---|---|
| 3,096,399 | 7/1963 | Thomas | 178—7.5 |
| 3,112,424 | 11/1963 | Suhrmann | 178—7.5 |
| 3,147,341 | 9/1964 | Gibson | 178—7.5 |

ROBERT L. GRIFFIN, *Primary Examiner.*

R. L. RICHARDSON, *Assistant Examiner.*